April 25, 1961   J. M. DRUMMOND ET AL   2,981,474
CONSTANT VOLUME AIR MIXING UNIT
Filed Feb. 17, 1958
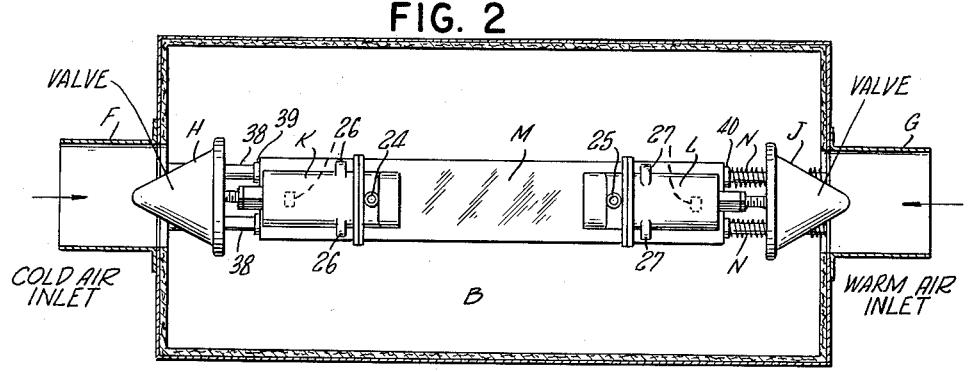
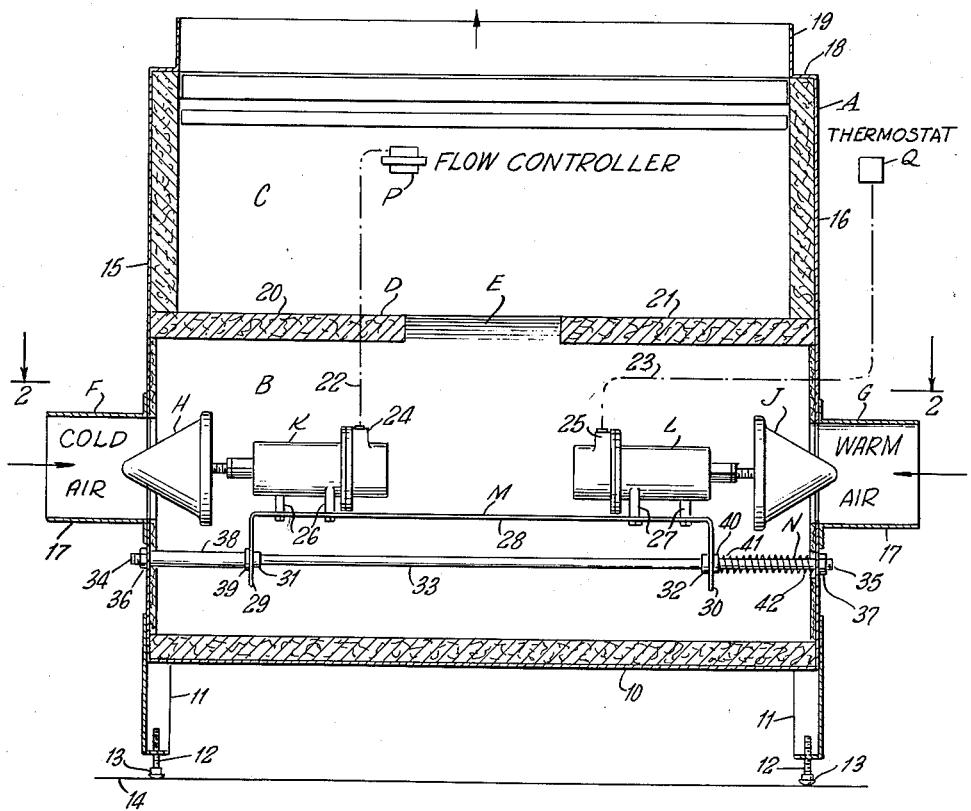
INVENTORS
JAMES M. DRUMMOND
DOUGLAS W. TORRY
BY
ATTORNEY United States Patent Office 2,981,474
Patented Apr. 25, 1961

2,981,474
CONSTANT VOLUME AIR MIXING UNIT
James M. Drummond and Douglas W. Torry, Detroit, Mich., assignors to Thermotank, Inc., Detroit, Mich., a corporation of Michigan
Filed Feb. 17, 1958, Ser. No. 715,587
7 Claims. (Cl. 236—13)

The present invention relates to a constant volume air mixing device and it particularly relates to a valve unit associated with such a device.

In controlling the cold and warm air which is supplied in air conditioning or ventilating systems, particularly where air under relatively high pressure is supplied in predetermined volume in varying proportions of warm or cold air, depending upon the temperature requirements inside an enclosure such as a room, office or other building, there has been considerable difficulty in regulating the proportionment of the cold and warm air while at the same time maintaining the inflow volume.

Even though the device may be provided with a thermostat control on the interior of the enclosure and a volume control on the low pressure side, nevertheless there is frequently an over-regulation, with too much or too little warm or cold air being supplied, and frequently one or other of the controls will cause a mal-operation or over-operation of the other control.

For example, in the usual system where the cold air inlet is controlled by a volume controller and the warm air is controlled by a thermostat in the enclosure, room, office or loft, as the case may be, there will frequently be an over-operation due to the fact that an excess amount of warm air on the one hand or an excess amount of cold air on the other hand may have to be introduced to maintain the predetermined volume flow.

It is therefore among the objects of the present invention to provide a simple, automatic control for a constant volume air mixing unit which will simultaneously maintain a constant volume flow and correct the proportions of the cold and warm air to give a predetermined temperature level in the enclosure being supplied.

Another object is to provide a simplified control for a constant volume air mixing unit, in which, with only a thermostat control for one valve and a volume control for the other valve, it will necessarily be possible to assure a constant flow of proper temperature air at reduced pressure without over-regulation resulting in an excess of either hot or cold air.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory, according to one embodiment of the present invention, to provide a constant volume air flow mixing unit including a box having high and low pressure chambers connected by an air flow orifice, and relatively high pressure cold air and warm air inlets on opposite sides of the high pressure chamber, each of which is controlled by a conical valve unit.

These conical valve units are respectively positioned adjacent the cold air and warm air inlets and are designed to open or close said inlets, depending upon the operation of an actuator which may be piston, diaphragm, or bellows, operated either pneumatically or hydraulically.

In the preferred system the cold air valve is operated by a volume controller, whereas the warm air valve is operated by a thermostat controller, the volume controller being within the box and in the low pressure chamber, while the thermostat is located in the enclosure, or room receiving the air mixture from the low pressure chamber.

A particular feature of the present invention resides in the fact that the valve actuators, whether they be cylindrically enclosed pistons, diaphragms or bellows, are mounted upon a common sliding platform which is spring biased in one or the other direction, depending upon the control conditions.

In the preferred form of the present invention the platform which is positioned in the high pressure chamber is spring biased so as to tend to close the cold air valve and tend to open the warm air valve.

Therefore when the cold air valve is fully closed further movement of the cold air valve by its actuator would cause the platform to move against the spring to move the warm air valve toward closed position.

On the other hand, when the cold air valve is released the first operation will be to open the warm air valve until the spring pressure is released, whereupon both valves will be slowly actuated by the volume controller for the cold air valve, and by the thermostat for the warm air valve.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Fig. 1 is a diagrammatic side elevational view of a double valve with sliding platform, according to the present invention.

Fig. 2 is a transverse sectional view taken upon the line 2—2 of Fig. 1.

Referring to Fig. 1, there is shown a box A with a high pressure chamber B and a low pressure chamber C with an intermediate baffle or dividing wall D having an intermediate orifice or slot E.

Into the high pressure chamber B there is a cold air inlet F and a hot air inlet G controlled respectively by the conical valve H and the conical valve J.

These valves respectively have actuators K and L which are mounted upon the sliding platform M biased to the left by the springs N.

The volume controller P will control the operation of the valve actuator K for the cold air valve H, whereas the thermostat Q will control the actuator L for the warm air valve J.

The base 10 of the box is shown as supported upon the legs 11 with the screw adjustments 12, which have the rubber domes 13 resting upon the floor 14. The side walls 15 and 16 respectively receive the sleeve 17, which are connected to sources of cold air and warm air respectively under pressure.

The top or roof 18 of the box A has the outlet connection 19 through which a proper mixture of hot and cold air of proper pressure may be fed into the enclosure, room, office, loft or the like, in accordance with the requirements.

Extending inwardly from the walls 15 and 16 are the baffle or barrier sections 20 and 21, between which is an orifice or inlet slot E, through which all the warm and cold air will flow from the high pressure chamber to the low pressure chamber C.

The interior of the box is lined with a sound-deadening material so as to eliminate any noise due to the flow of the air and its reduction in pressure.

The valve actuators K and L have the connections respectively at 22 and 23 from the volume flow controller P and the thermostat Q, to the actuator bodies at 24 and 25.

The bodies are mounted by the legs 26 and 27 on the platform M.

The principal feature of the present invention arises because of the sliding mounting of the platform M and its biasing by the spring N toward closure of the cold air valve H.

The platform M has a main base portion 28 with depending end flanges 29 and 30 which have parallel spaced bearings 31 and 32 to slide on a pair of parallel rods 33. These rods are mounted in the walls 15 and 16 by means of the threaded end portions 34 and 35, having the nuts 36 and 37.

The left end of each rod 33 is encircled by a stop sleeve 38, which limits the leftward movement of the platform M. This sleeve will abut the enlarged end portion 39 of the bearing 31.

Against the other enlarged end portion 40 of each bearing 32 presses the end 41 of a spring N. The other N, 42, of the spring end presses against the interior face of the side wall 16. The springs N will normally bias the flange 29 against the stop sleeves 38.

In normal operation, the cold air will flow in through the inlet F and the warm air will flow in through the inlet G. The volume flow controller P will regulate the volume flowing through the orifice E, while the thermostat Q will regulate the proportions of cold and warm air to give the desired temperature control.

However, assuming that the thermostat Q indicates there should be more warm air and opens the valve J, there will be an increased flow of warm air into the chamber B and through the slot E into the chamber C, which will actuate the volume controller P to move the cold air valve H to reduce the volume flow through the slot or orifice E to that predetermined by the setting thereof.

In case the control is such that the cold air valve will be closed instead of being partly open, then this closure will, if continued, force the valve actuator K to the right, moving the sliding platform to the right against the springs N and tending to close the warm air valve, which will again reduce the flow affecting the volume flow controller.

This then will result in the cold air valve opening again and cause the cold air valve and the warm air valve to assume their proper positions where the volume flow is constant, but there is an increased proportion of the warm air relative to the cold air to satisfy the changed requirements of the thermostat Q.

In short, the operation, if over-regulated to close the cold air valve H, will always result in a subsequent closing of the warm air valve J, due to the movement of the platform M, until both valves are open again and the proper proportionment is achieved as a result of the movability of the platform M against the spring N.

Although it is desired to use the spring N and the rods 33 in pairs, three, four, or even six of these rods and springs may be employed to give the proper regulating and guiding effect to the sliding platform M.

It is thus apparent that the invention provides for the proper regulation of high pressure cold air and warm air systems so that, even though only the cold air valve is controlled by the volume controller and the warm air valve is controlled by the thermostat, nevertheless a control regulation of warm air and cold air will be achieved without over-regulation and with a constant volume flow of air of proper temperature being achieved.

As many changes could be made in the above constant volume air mixing unit, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. In a constant volume flow air mixing box of the type having opposed aligned cold air and warm air inlets and an outlet for the air mixture produced in the mixing box, a conical valve controlling each of said inlets, a motor controlling each conical valve having a reciprocable element to move the conical valve and a cylindrical body member, a thermostat controller connected to the warm air valve motor only, a volume flow controller connected to the cold air valve motor only; the combination therewith of a common horizontal sliding platform, both body members being mounted on said platform at the respective end portions thereof, said platform at the ends thereof having downturned flanges, a pair of guide rods extending between the inlets and parallel to the axis of the aligned air inlets extending through said flanges, and coil spring means encircling said guide rods biasing said platform and the conical cold air valve toward the cold air inlet and tending to close the cold air inlet.

2. A constant volume air mixing box as claimed in claim 1, in which the box includes a high pressure chamber and a low pressure chamber connected by an orifice for the flow of air from the high pressure chamber to the low pressure chamber, said air inlets opening into the high pressure chamber and said conical valves, motors, platform, guide rods and coil spring means being located in the high pressure chamber while said volume flow controller is located in the low pressure chamber.

3. An air mixing box as claimed in claim 1, including means for limiting the movement of said platform toward the cold air inlet to a position in which the cold air valve is movable to open and closed positions by its motor.

4. A hot and cold air mixing unit for delivering a flow of air into an enclosure to be supplied with air, comprising an air mixing box provided with cold air and warm air inlets and an air outlet for delivering air to the enclosure, a valve member in the box for controlling each of said air inlets, a movable carrier mounted in the box, an actuator for each valve member mounted on said carrier including means for independently moving the valve members toward and away from the respective air inlets, a thermostat located in the enclosure receiving the flow of air from the box and connected only with the actuator for actuating the warm air valve member toward and away from the warm air inlet in response to changes in the temperature of the air in the enclosure, a volume flow controller connected only with the actuator for the cold air valve member, and means for biasing the movable carrier in a direction to move the cold air valve member toward closed position with respect to the cold air inlet.

5. An air mixing unit as claimed in claim 4, including means for limiting the movement of said carrier in said direction to a position in which the cold air valve member is movable to open and closed positions by its actuator.

6. A mixing unit as claimed in claim 4, including means for limiting the movement of said carrier in said direction to a position in which the cold air valve member is movable to open and closed positions by its actuator, and in which the continued operation of the cold air valve actuator when and after moving the cold air valve to closed position moves the carrier member in the opposite direction and the warm air valve member toward closed position in opposition to said biasing means.

7. A hot and cold air mixing unit for delivering a flow of air into an enclosure to be supplied with air, comprising an air mixing box including a high pressure chamber and a low pressure chamber connected by an orifice for the flow of air from the high pressure chamber to the low pressure chamber, the low pressure chamber having an air outlet for delivering air to the enclosure, said high pressure chamber being provided with cold air and warm air inlets, a valve member in the high pressure chamber for controlling each of said air inlets, a movable carrier mounted in the high pressure chamber, an actuator for each valve member mounted on said carrier including means for independently moving the associated valve member toward and away from its associated air inlet, a thermostat located in the enclosure receiving the flow of air from the box and connected with and controlling the actuator for actuating the warm air valve member toward and away from the warm air inlet in response to changes in the temperature of the air in the enclosure, a volume flow controller located in the low pressure chamber and connected with and controlling the actuator for the cold air valve member, and means independent of the action of the thermostat and controller for biasing the movable carrier in a direction to move one of said valve members toward closed position with respect to its associated air inlet.

References Cited in the file of this patent
UNITED STATES PATENTS

| | | |
|---|---|---|
| 2,508,074 | Miller et al. | May 16, 1950 |
| 2,821,343 | Payne | Jan. 28, 1958 |
| 2,828,076 | Donahue | Mar. 25, 1958 |